(No Model.) 6 Sheets—Sheet 4.
W. HUMANS.
ATTACHMENT FOR METAL WORKING LATHES.
No. 459,867. Patented Sept. 22, 1891.
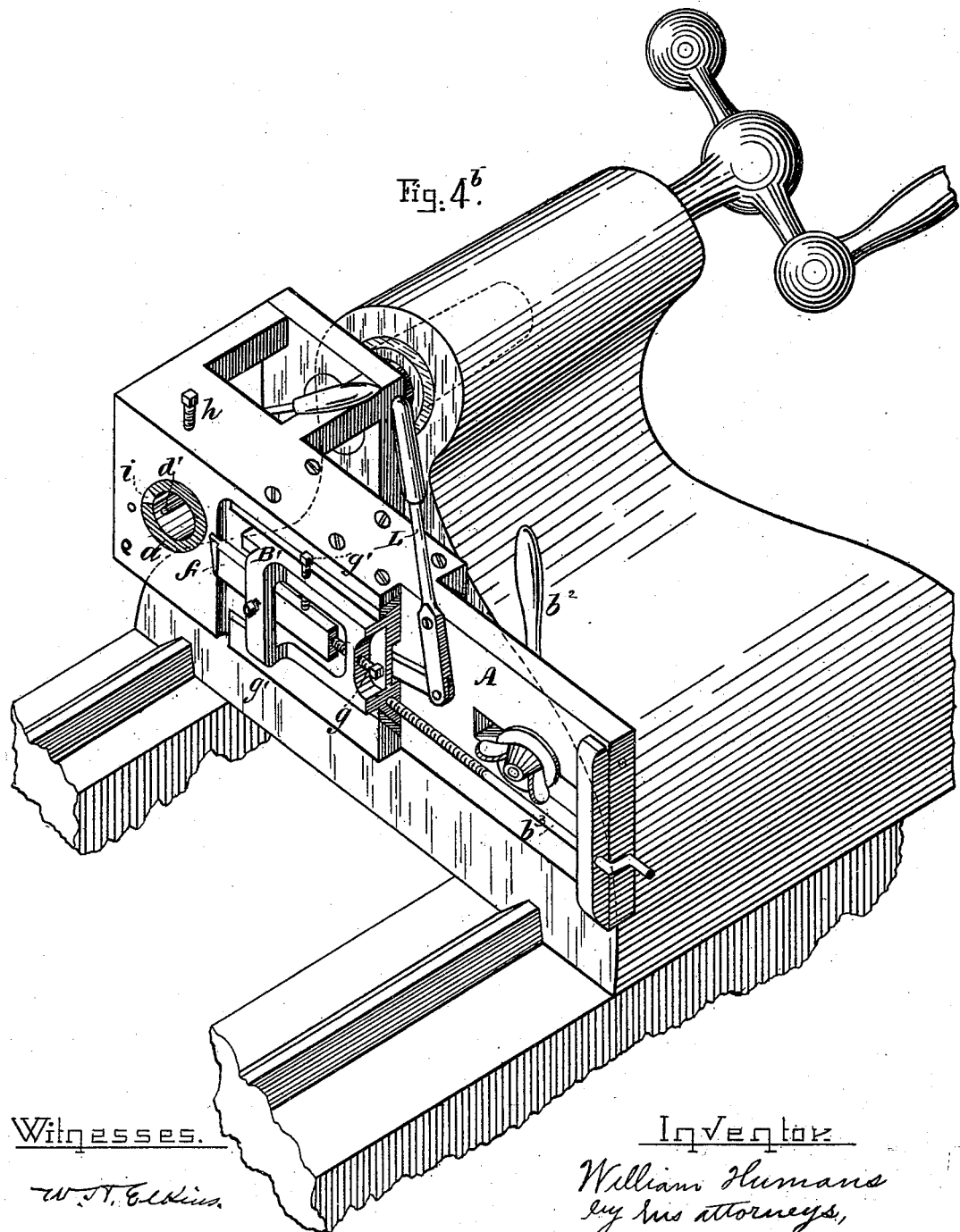

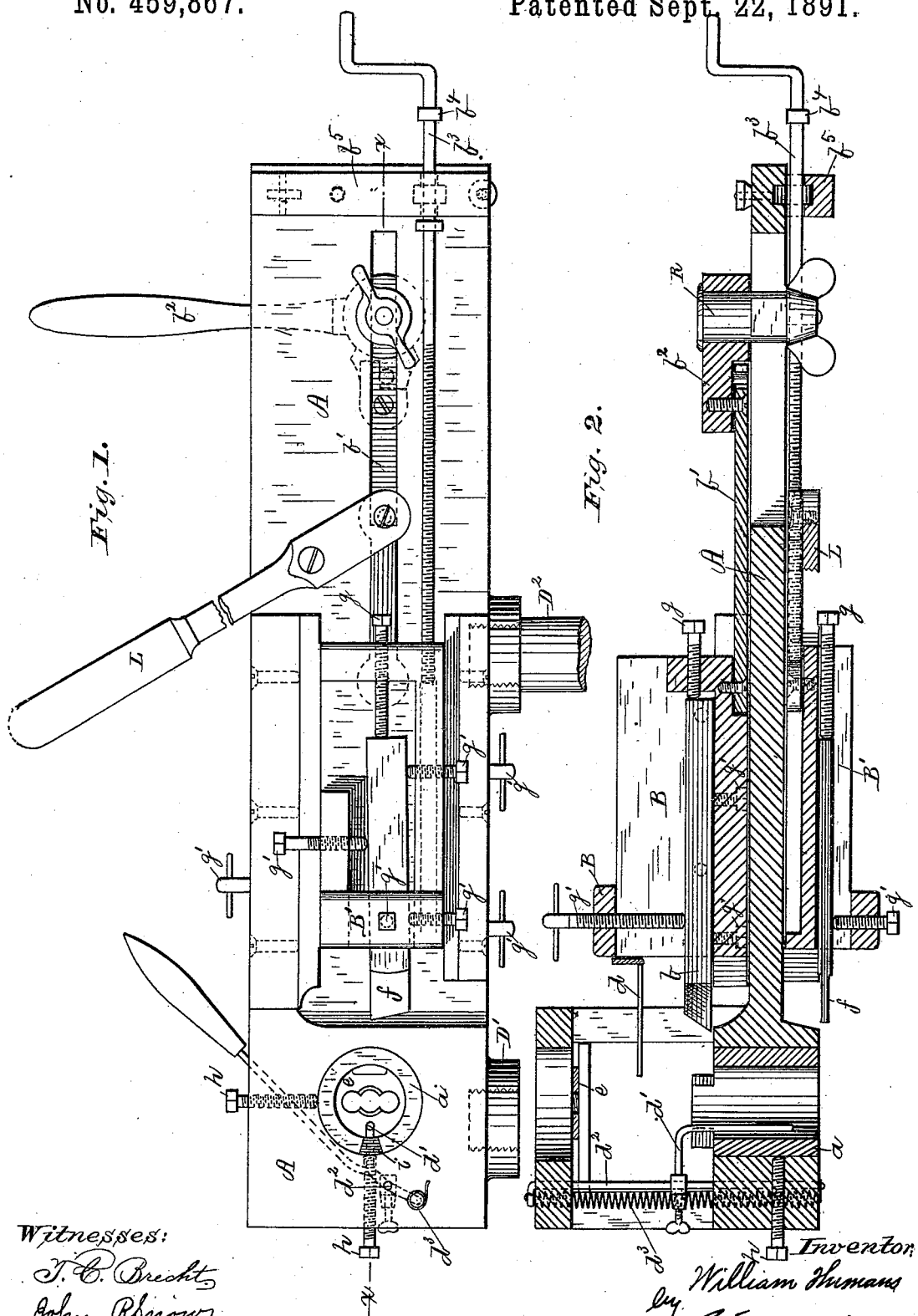

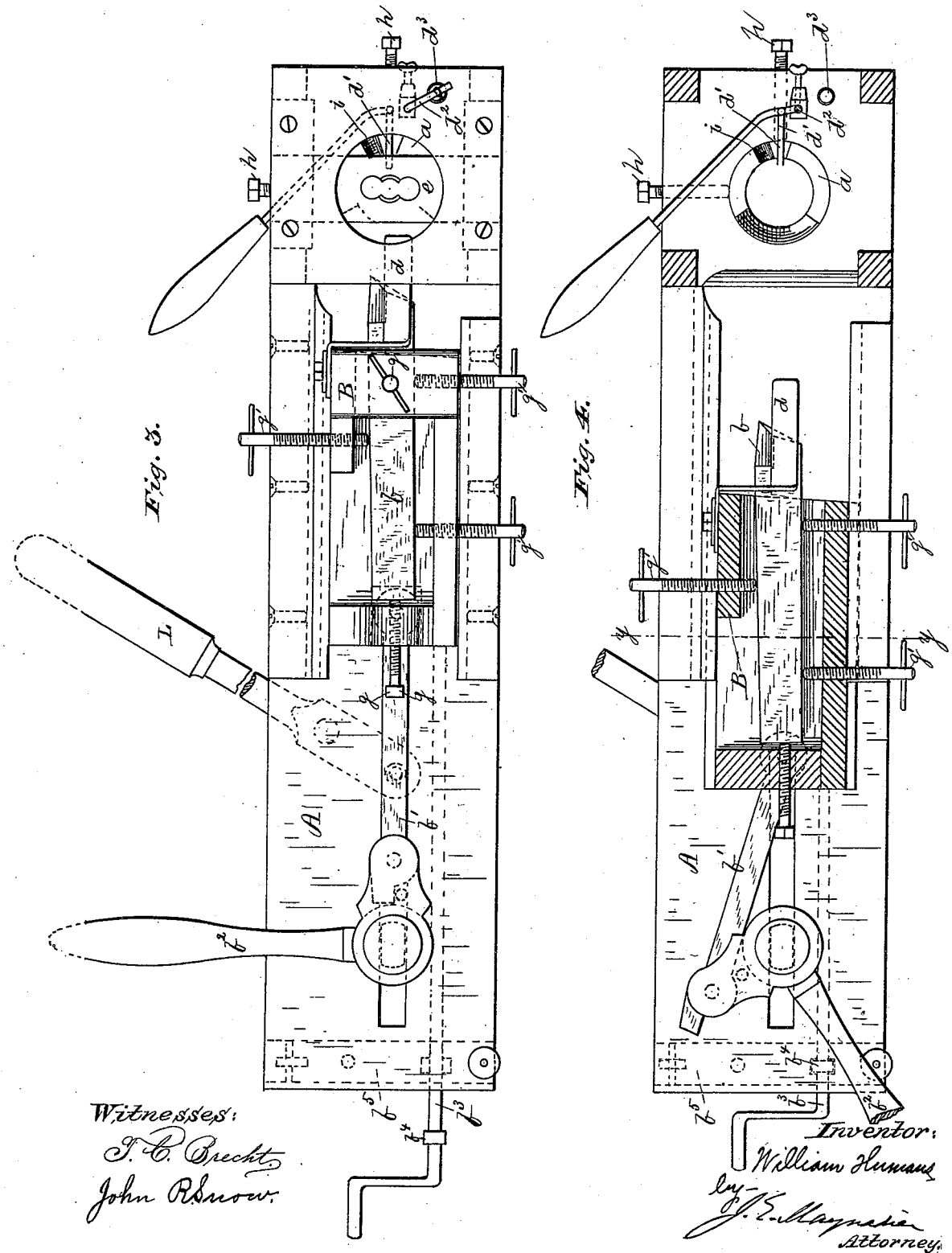

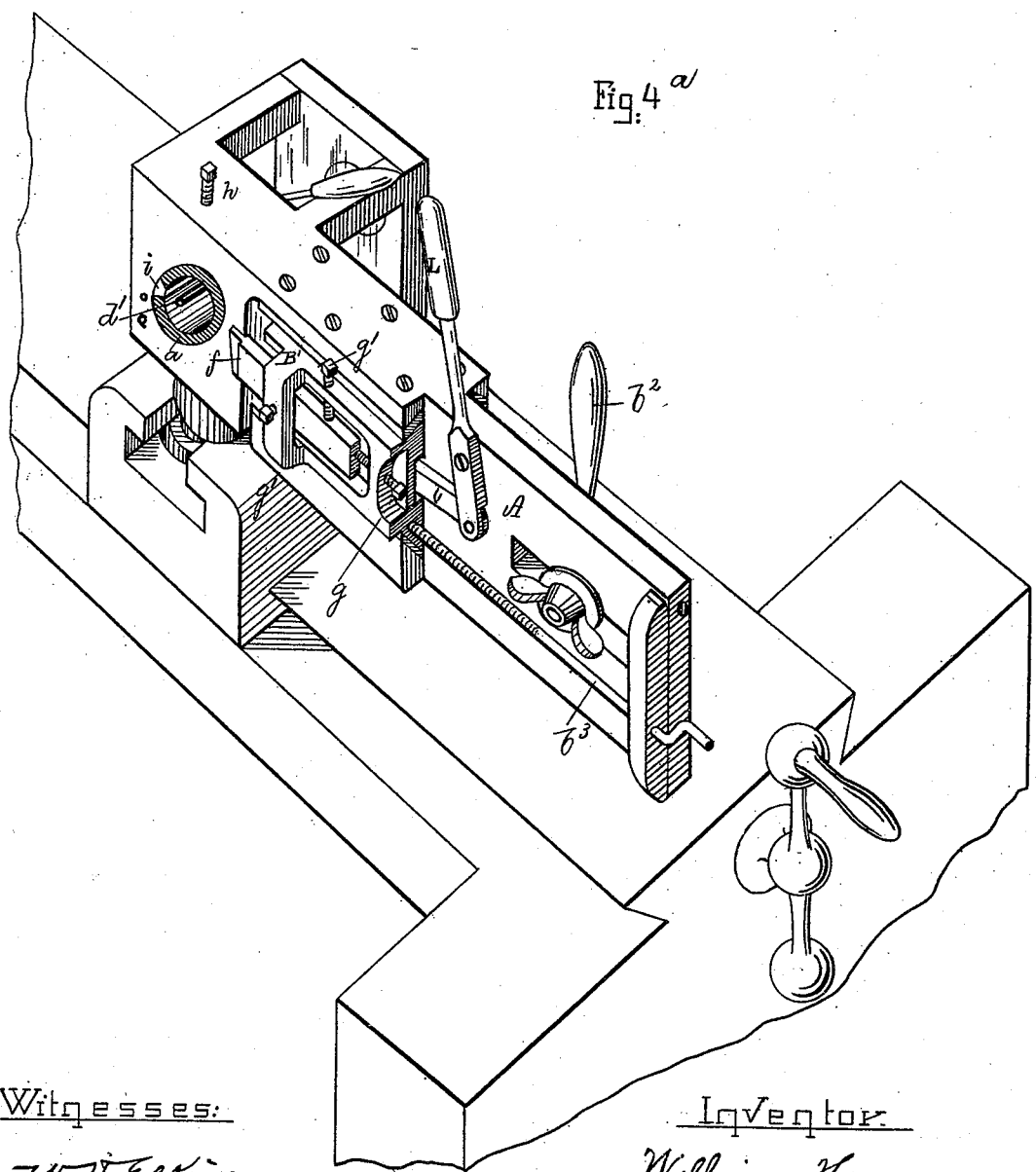

(No Model.) 6 Sheets—Sheet 5.
W. HUMANS.
ATTACHMENT FOR METAL WORKING LATHES.
No. 459,867. Patented Sept. 22, 1891.
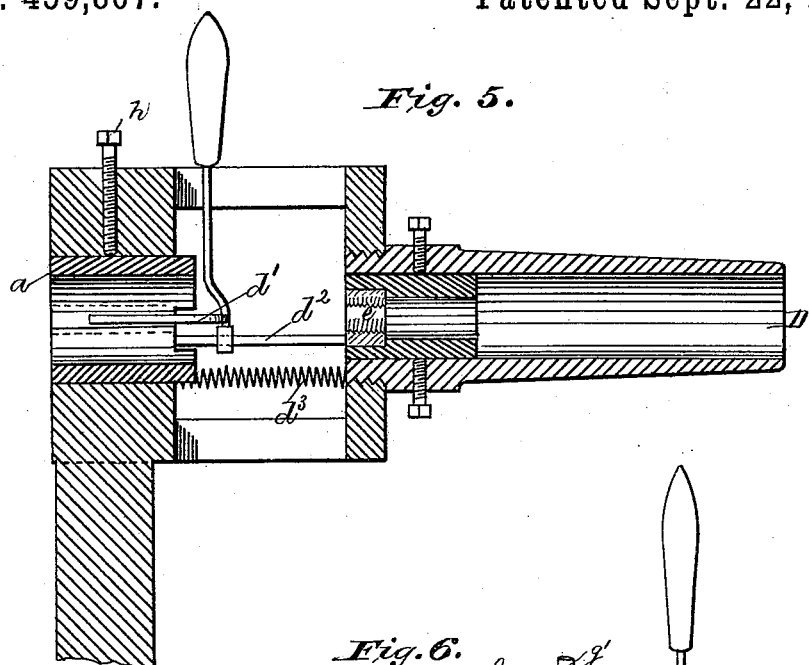
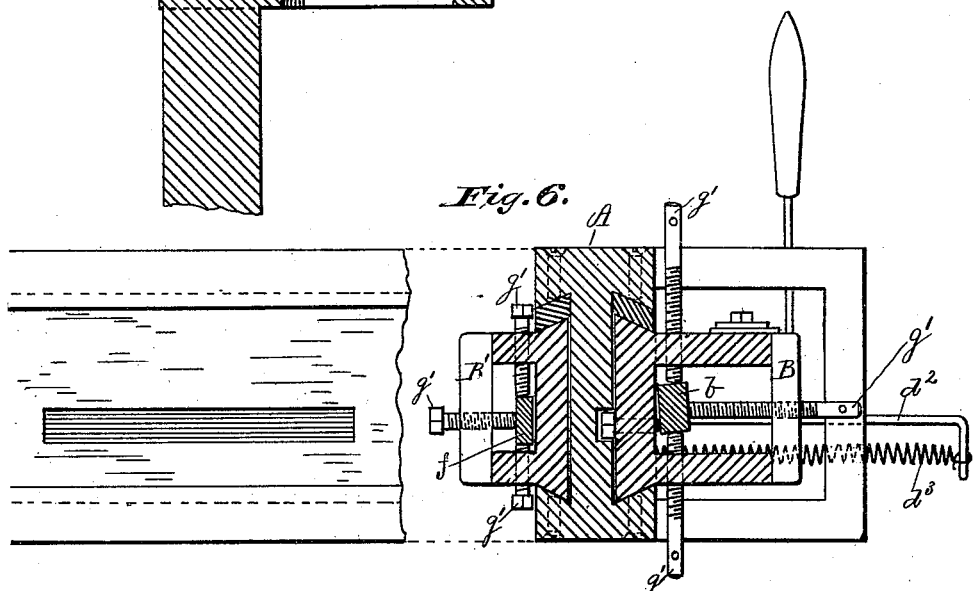
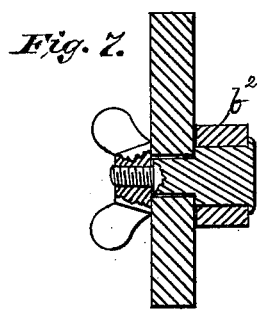
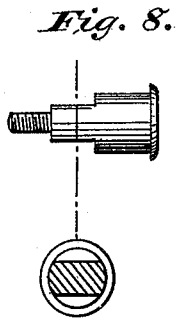
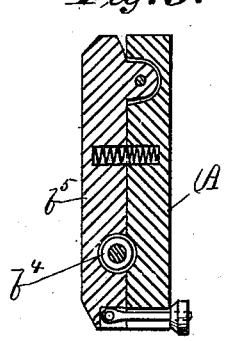
Witnesses:
T. C. Brecht
John R. Snow.
Inventor:
William Humans,
by
J. E. Maynadier
Attorney.

(No Model.) 6 Sheets—Sheet 6.
W. HUMANS.
ATTACHMENT FOR METAL WORKING LATHES.
No. 459,867. Patented Sept. 22, 1891.
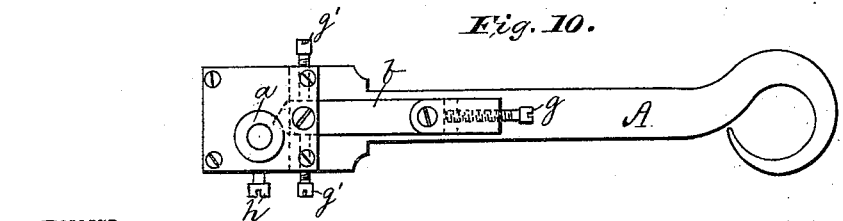
Fig. 10.
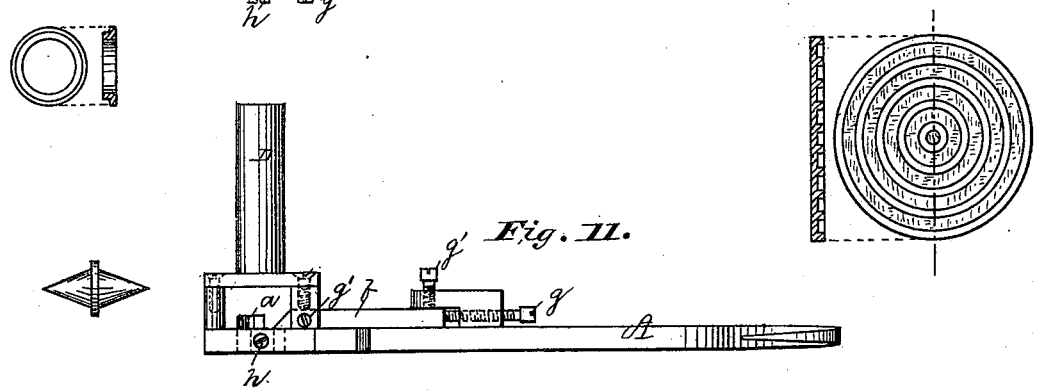
Fig. 11.
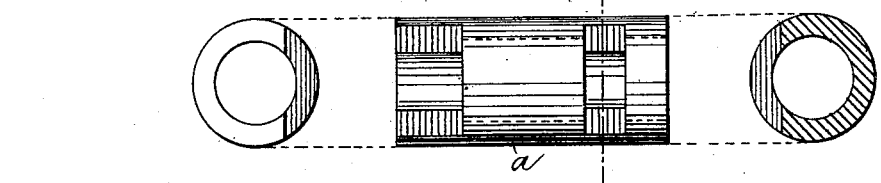
Fig. 12.
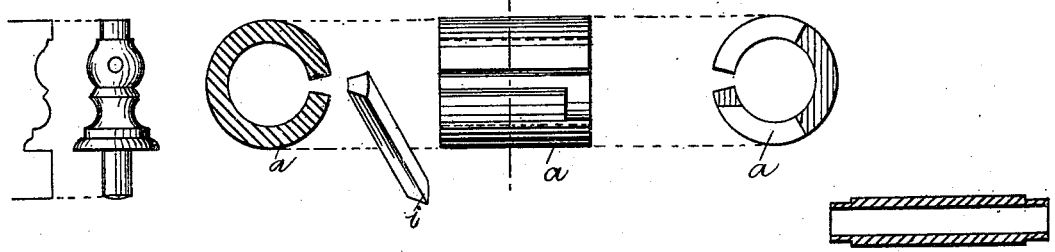
Fig. 13.
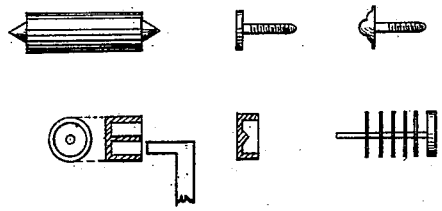
Witnesses:
T. C. Brecht
John R. Snow
Inventor:
William Humans
by
J. E. Maynadier
Attorney.

UNITED STATES PATENT OFFICE.

WILLIAM HUMANS, OF CAMBRIDGE, MASSACHUSETTS, ASSIGNOR TO THE AMERICAN MAGNETIC ELECTRIC COMPANY, OF JERSEY CITY, NEW JERSEY.

ATTACHMENT FOR METAL-WORKING LATHES.

SPECIFICATION forming part of Letters Patent No. 459,867, dated September 22, 1891.

Application filed July 23, 1885. Serial No. 172,438. (No model.)

*To all whom it may concern:*

Be it known that I, WILLIAM HUMANS, of Cambridge, in the county of Middlesex and State of Massachusetts, have invented a new and useful Attachment for Metal-Working Lathes, of which the following is a specification, reference being had to the accompanying drawings, making a part hereof, in which—

Figures 1 and 3 are side elevations; Fig. 2, a section on line $x\ x$ of Fig. 1, showing one of my attachments. Fig. 4 is a side elevation, partly in section. Figs. $4^a$ and $4^b$ are views more clearly showing the construction of my attachment and its relation to the lathe. Fig. 5 is a sectional elevation showing a modification. Figs. 6, 7, 8, 9, 12, and 13 are details, Fig. 6 being a section on the section-line $y\ y$ in Fig. 4. Figs. 10 and 11 illustrate a modification which is a simpler form of tool embodying the main feature of my invention.

The other figures show different forms of work done.

My invention consists, essentially, in a plate adapted for use with a lathe and provided with a bushing to receive and center the stock, which bushing has a segment removed to allow the tool to pass through the wall of the bushing and remove the surplus material from the stock.

Another feature of my invention consists in a slide mounted upon the plate and provided with binding-screws or the like to clamp the tool firmly in place on the slide, in combination with a lever and link by which the slide is moved forward and back.

A third feature consists in a tool post or holder provided with clamping-screws, which bear both sides of the tool, whereby the tool may be adjusted with extreme accuracy—that is to say, the tool can be adjusted to the proper cutting angle sidewise, whether made just right or not, by simply manipulating the screws.

The other features of my invention consist in gages for the length of the shank and head of a screw or like knob, the shank-gage being a plate attached to the tool-post, and made adjustable, of course, when the attachment is desired for different lengths of shanks, this part of my invention being the combination, with the tool-post, of a plate which projects forward into the axis of the stock, so that when the end of the stock strikes the gage-plate the proper length of shank has been formed. The head-gage is a spring-gage, which is moved in one direction by hand or by the stock, and is so set that it brings the cutter by which the stock is cut off to form the head into proper relation with the stock. The spring serves to set the head-gage in proper relation with the cutting-off tool, and also allows the head-gage to be moved out of the way of the stock, for the head-gage is within the bushing, and must of course be moved out of the way when the blank-stock is in the bushing; but after the shank has been turned down and the thread cut by the die, when a thread is formed, the head-gage is thrown into place by its spring and the stock is then cut off, forming the head of the screw.

In the drawings, A is the plate; $a$, the bushing; B, the tool-post for the main tool; B′, the tool-post for the cutting-off tool $f$; $D^2$, a post secured to the boss, to which it is shown as screwed in Fig. 1, or to the boss D′, this post $D^2$ corresponding to the tool-post which is attached to the slide-rest of an ordinary lathe—that is, the plate A, with its adjuncts, takes the place of the tool-post in an ordinary lathe or is controlled by the spindle of the tail-stock, as described below with reference to Figs. 5, 10, and 11.

In Fig. $4^a$ my new attachment is mounted in an ordinary tool-post slide which is controlled by the usual spindle or screw.

In Fig. $4^b$ the sleeve D is inserted in the hollow spindle of the usual tail-stock. By plate A is meant not only the plate proper but also its adjuncts.

The main tool $b$ is clamped in and adjusted with relation to its post B by means of the screws $g\ g'$, and the cutting-off tool $f$ is similarly clamped in and adjusted with relation to its post B′. These adjusting and clamping screws $g$ and $g'$ are well shown in Figs. 1, 2, 3, 4, and 6, and serve not only to hold the tools in their respective tool-posts, but also to adjust the cutting-angle of the tools.

The tool-post B is moved forward and back in ways by means of the link $b'$ and lever $b^2$, and is locked in its forward position by the stop on the short arm of lever $b^2$ engaging with the projection on the end of link $b'$, as in Fig. 3, as soon as the joint between the link $b'$ and lever $b^2$ passes from the position shown in Fig. 4 to the position shown in Fig. 3, the latter figure showing the parts locked in position, while in Fig. 4 the tool-post B is shown drawn back by the link $b'$ and lever $b^2$. The fulcrum R of the lever $b^2$ is adjustable to vary the position of tool-post B as required for longer or shorter tools. This is a rough adjustment so far as concerns bringing the cutting-edge of the tool $b$ in proper relation to the stock; but when the diameter of the shank is slightly too large or too small the exact adjustment is obtained by means of the screw $g$, which bears against the end of the cutter.

The tool-post B' is moved ordinarily by the lever L and link $l$, as will be clear from the drawings; but when a finer movement is desired the screw $b^3$ is used, the collar $b^4$ on the screw-shaft being kept from endwise motion by the clamp $b^5$, (see Figs. 9 and 4,) in both of which the collar $b^4$ is so held by the clamp $b^5$ in order to give the finer feed movement to tool-post B'; but in Figs. 1, 2, and 3, $b^4$ is shown disengaged from clamp $b^5$ in order that the tool-post B' may be moved by the link L and lever $l$. A recess is formed between plate A and clamp $b^5$, which receives collar $b^4$, so as to hold it from endwise movement when clamp $b^5$ is close against plate A, as in Fig. 2, with collar $b^4$ in the recess.

The shank-gage $d$ is adjustably secured to the post B by a screw and washer, as indicated in Figs. 3 and 4, so that it projects across the axis of the bushing $a$ when the tool $b$ is in contact with the stock; but is out of the way when the tool $b$ is withdrawn. The head-gage $d'$ is adjustably secured to the cross-rod $d^2$ by a sleeve fast to gage $d'$, and held by a set-screw to cross-rod $d^2$, which is free to move endwise, and which is held in position by the spring $d^3$.

The modification shown in Fig. 5 is in all respects like the form already described and shown in Figs. 1, 2, 3, and 4, except the bosses—one of which is marked D', and the other takes the post $D^2$, as shown in Fig. 1—are replaced by the sleeve D, which is adapted to enter the hollow spindle of the tail-stock of a lathe. In this form of my invention the attachment is fed toward the head-stock, not by the slide-rest as before but by the feed-screw of the tail-stock.

In Figs. 10 and 11 the tool $b$ and bushing $a$ are as above described, and the sleeve N corresponds to sleeve D in Fig. 5, except that it is not formed to enter the spindle of the tail-stock; but simply to be fed forward by the forward motion of that spindle.

The operation is as follows: The attachment being secured in the lathe and the stock held by and revolving with the head-stock of the lathe, the attachment is fed toward the head (by the motion of the slide-rest or by the motion of the tail-stock spindle, as the attachment is controlled by the one or the other) the bushing $a$ passing over the free end of the stock and serving to center and support the stock under the action of tool $b$, by which the end of the stock is shaped to make the shank of the screw; but as soon as the end of the stock comes in contact with shank-gage $d$ the operator draws the tool post B back and the attachment is fed toward the head-stock until the screw-thread is cut. The attachment is then moved back, and the free end of the head-gage $d'$ is thrown in place, by means of the handle attached to cross-rod $d^2$ and gage $d'$, by which the cross-rod is turned on its axis until the free end of gage $d'$ is in position to enter bushing $a$, when the spring $d^3$ will carry gage $d'$, and cross-rod $d^2$ endwise, causing the free end of gage $d'$ to enter bushing $a$, as more clearly shown in Fig. 2.

I have described the attachment as used for forming screws, but it will be obvious that an almost unlimited variety of work can be done with the attachment, examples being shown in the drawings. It will also be clear that when but one tool is used the modification shown in Figs. 10 and 11 contains all that is essential.

It is desirable that the bushing should be a snug fit for the stock, and in practice I use a number of bushings $a$, each of the same outer diameter but of different inner diameters. For slight differences in diameter of stock and where smooth work is required the bushing should be slit, as in Fig. 13, so that it may be slightly expanded by setting up the screw $h$, which bears upon the wedge $i$, (shown in perspective as a part of Fig. 13,) and slacking the other screw $h$, (shown in Fig. 1,) or slightly contracted by slacking the screw $h$, bearing on wedge $i$, and setting up the other screw $h$.

In Fig. 12 I have shown the bushing as a complete cylinder on both sides of the aperture for the cutting-off tool. This is very important where screws with very thin heads are to be made or when other like work is to be done, and constitutes a valuable feature of my invention.

The combination of a bushing, a tool to shape the shank, and a screw-threading die, all arranged as shown, whereby the stock is supported by the bushing under the action of the shank-forming tool and also supported by the bushing while the shank is threaded by the die, is also a valuable feature of my invention.

I have shown the die $e$ in Fig. 5 mounted in a bushing, but it may of course be in the well-known form of a die-plate, as shown in Fig. 2.

What I claim as my invention is—

1. In a lathe attachment, the combination of plate A, tool $b$, and a bushing $a$, having a segment removed, through which the tool acts upon the stock in the bushing, all the parts arranged and operating substantially as described.

2. In a lathe attachment, plate A, bushing $a$, its wedge $i$, and the set-screws $h\ h$, in combination with tool $b$, substantially as described.

3. In a lathe attachment, plate A, in combination with a sliding tool-post, a tool carried by the tool-post, and a link and lever for moving the tool-post on the plate, all substantially as described.

4. In a lathe attachment, the combination of plate A with a tool-post, its tool, and a gage, the tool-post sliding on the plate and carrying the tool and the gage, all substantially as described.

WILLIAM HUMANS.

Witnesses:
J. E. MAYNADIER,
JOHN R. SNOW.